(12) United States Patent  (10) Patent No.: US 9,183,562 B2
Chittilappilly et al.  (45) Date of Patent: Nov. 10, 2015

(54) METHOD AND SYSTEM FOR DETERMINING TOUCHPOINT ATTRIBUTION

(75) Inventors: Anto Chittilappilly, Waltham, MA (US); Madan Bharadwaj, Billerica, MA (US); Payman Sadegh, Alpharetta, GA (US); Darius Jose, Thrissur (IN)

(73) Assignee: VISUAL IQ, INC., Needham, MA (US)

( * ) Notice: Subject to any disclaimer, the term of this patent is extended or adjusted under 35 U.S.C. 154(b) by 6 days.

(21) Appl. No.: 13/492,493

(22) Filed: Jun. 8, 2012

(65) Prior Publication Data

US 2013/0332264 A1   Dec. 12, 2013

(51) Int. Cl.
   *G06Q 30/02*   (2012.01)
(52) U.S. Cl.
   CPC ..................... *G06Q 30/02* (2013.01)
(58) Field of Classification Search
   CPC ................................. G06Q 30/0244
   USPC .......................... 705/14.43, 14.45
   See application file for complete search history.

(56) References Cited

U.S. PATENT DOCUMENTS

| | | | | |
|---|---|---|---|---|
| 7,685,019 B2 * | 3/2010 | Collins | ............... | G06F 17/2785 |
| | | | | 705/14.41 |
| 7,904,327 B2 * | 3/2011 | Phelan et al. | ................. | 705/7.29 |
| 7,979,308 B2 * | 7/2011 | Ho et al. | ....................... | 705/14.7 |
| 8,108,254 B2 * | 1/2012 | Lin | ......................... | G06Q 30/00 |
| | | | | 705/14.41 |
| 8,527,350 B2 * | 9/2013 | Ma | ......................... | G06Q 30/02 |
| | | | | 705/14.68 |
| 8,548,851 B2 * | 10/2013 | Chen | ...................... | G06Q 30/02 |
| | | | | 705/14.4 |
| 8,595,071 B2 * | 11/2013 | Veach | .................... | G06Q 30/02 |
| | | | | 705/14.3 |
| 2007/0027753 A1 | 2/2007 | Collins | | |
| 2007/0033104 A1 | 2/2007 | Collins | | |
| 2007/0239517 A1 * | 10/2007 | Chung | ............... | G06Q 30/0255 |
| | | | | 705/14.53 |
| 2008/0300977 A1 | 12/2008 | Gerakos | | |
| 2009/0119172 A1 | 5/2009 | Soloff | | |
| 2009/0327028 A1 * | 12/2009 | Collins | ............... | G06Q 30/0244 |
| | | | | 705/14.43 |
| 2011/0035272 A1 * | 2/2011 | Bhatt | ..................... | G06Q 30/02 |
| | | | | 705/14.42 |
| 2011/0071900 A1 * | 3/2011 | Kamath et al. | ............. | 705/14.46 |
| 2011/0191714 A1 * | 8/2011 | Ting | ........................ | G06F 3/048 |
| | | | | 715/805 |
| 2011/0231239 A1 * | 9/2011 | Burt | .................... | G06Q 30/0242 |
| | | | | 705/14.41 |
| 2011/0246267 A1 * | 10/2011 | Williams | ................ | G06Q 30/02 |
| | | | | 705/14.4 |
| 2012/0054019 A1 * | 3/2012 | Kitts | ................... | G06Q 30/0242 |
| | | | | 705/14.41 |
| 2012/0116787 A1 * | 5/2012 | Crites | .................... | G06Q 30/02 |
| | | | | 705/1.1 |
| 2012/0259854 A1 * | 10/2012 | Hsiao | ................. | G06Q 30/0251 |
| | | | | 707/739 |
| 2012/0303447 A1 * | 11/2012 | Hughes | .............. | G06Q 30/0255 |
| | | | | 705/14.46 |
| 2013/0066711 A1 * | 3/2013 | Liyanage | ............... | G06Q 50/01 |
| | | | | 705/14.43 |

OTHER PUBLICATIONS

John Lovett of Forrester Research, Feb. 19, 2009 A Framework for MultiCampaign Attribution Measurement.*

(Continued)

*Primary Examiner* — Thomas M Hammond, III
*Assistant Examiner* — Breffni X Baggot
(74) *Attorney, Agent, or Firm* — Law Offices of John Stattler, PC

(57) ABSTRACT

A system and method for allocating credit for an advertising conversion among various advertising touchpoints encounter by the consumer is provided. The system and method comprise receiving data pertaining to touchpoints and conversions of an advertising campaign across multiple channels. Users are correlated across the channels and the various conversions, touchpoints, and touchpoint attributes are identified. Each touchpoint attribute and touchpoint attribute value is assigned a weight. An attribution algorithm is selected, and coefficients are calculated using the assigned weights. The algorithm is executed and true scores corresponding to the touchpoints encountered by each converting user are computed.

9 Claims, 16 Drawing Sheets

(56) References Cited

OTHER PUBLICATIONS

Shao, Data Driven Multi Touch Attribution Models, KDD'11, Aug. 21-24, 2011, San Diego, California, USA.*

Fuor Digital, Multi-Touch Conversion Tracking: Path to Conversion and Conversion Attribution, Apr. 2009 http://www.slideshare.net/fuordigital/multi-touch-conversion-tracking-1477034#.*

Fuor Digital, Research Brief: Conversion Attribution, Feb. 2009.*

Malm, Kaylan, iCrossing Capabilities Report: Cross-Channel Attribution Modeling in Action, Aug. 2009.*

Chandler-Pepelnjak, John, Modeling Conversions in Online Advertising, May 2010.*

Forrester, Feb. 19, 2009 A Framework for Multicampaign Attribution Measurement by John Lovett for Direct Marketing Professionals.*

Apr. 16, 2009 "Multi-Touch Conversion Tracking" by Fuor Digital, http://www.slideshare.net/fuordigital/multi-touch-conversion-tracking-1477034).*

* cited by examiner

ATTRIBUTE WEIGHTS
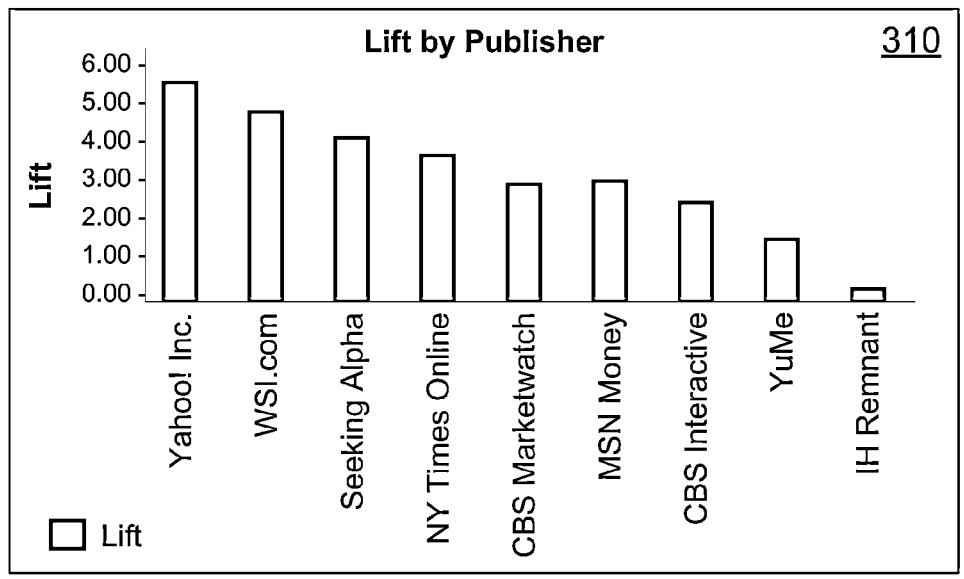
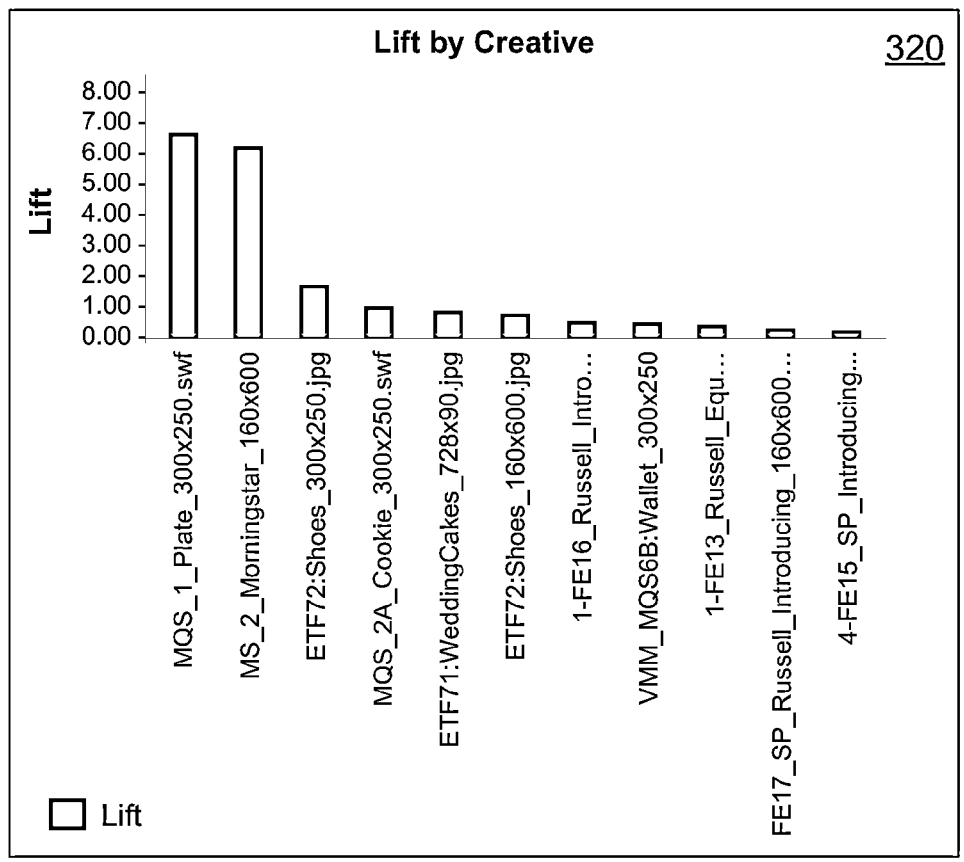
FIG. 3

| ID | Channel | TimeStamp | UserID | Attribute1 | Attribute2 | Attribute3 | Attribute4 | Conversion |
|---|---|---|---|---|---|---|---|---|
| 1 | CH1 | 5/24/10 8:38 PM | U1 | A1_Value1 | A2_Value4 | A3_Value4 | A4_Value5 | 1 |
| 2 | CH1 | 5/23/10 7:45 AM | U1 | A1_Value1 | A2_Value1 | A3_Value1 | A4_Value1 | 0 |
| 3 | CH1 | 5/23/10 7:23 AM | U1 | A1_Value4 | A2_Value2 | A3_Value5 | A4_Value6 | 0 |
| 4 | CH1 | 5/17/10 12:47 PM | U1 | A1_Value3 | A2_Value5 | A3_Value2 | A4_Value6 | 0 |
| 5 | CH1 | 5/15/10 5:04 AM | U1 | A1_Value3 | A2_Value2 | A3_Value4 | A4_Value4 | 0 |
| 6 | CH1 | 5/3/10 11:10 PM | U1 | A1_Value1 | A2_Value2 | A3_Value3 | A4_Value3 | 0 |
| 7 | CH1 | 5/2/10 10:14 PM | U1 | A1_Value2 | A2_Value1 | A3_Value1 | A4_Value3 | 1 |
| 1 | CH1 | 5/23/10 6:07 PM | U2 | A1_Value4 | A2_Value2 | A3_Value5 | A4_Value6 | 0 |
| 2 | CH1 | 5/22/10 9:51 AM | U2 | A1_Value3 | A2_Value5 | A3_Value2 | A4_Value6 | 0 |
| 3 | CH1 | 5/17/10 10:48 AM | U2 | A1_Value3 | A2_Value2 | A3_Value4 | A4_Value4 | 0 |
| 4 | CH1 | 5/15/10 11:15 AM | U2 | A1_Value1 | A2_Value2 | A3_Value3 | A4_Value3 | 0 |
| 5 | CH1 | 5/11/10 5:48 AM | U2 | A1_Value2 | A2_Value2 | A3_Value1 | A4_Value3 | 0 |
| 1 | CH1 | 5/22/10 8:37 AM | U3 | A1_Value1 | A2_Value2 | A3_Value3 | A4_Value1 | 0 |
| 2 | CH1 | 5/19/10 9:29 PM | U3 | A1_Value2 | A2_Value2 | A3_Value1 | A4_Value1 | 0 |
| 3 | CH1 | 5/15/10 2:57 PM | U3 | A1_Value2 | A2_Value4 | A3_Value1 | A4_Value1 | 0 |
| 4 | CH1 | 5/12/10 10:33 PM | U3 | A1_Value1 | A2_Value2 | A3_Value4 | A4_Value5 | 0 |
| 5 | CH1 | 4/27/10 11:47 PM | U3 | A1_Value4 | A2_Value5 | A3_Value5 | A4_Value6 | 0 |
| 6 | CH1 | 4/26/10 1:53 PM | U3 | A1_Value3 | A2_Value2 | A3_Value2 | A4_Value4 | 0 |
| 7 | CH1 | 4/25/10 8:30 AM | U3 | A1_Value3 | A2_Value4 | A3_Value4 | A4_Value5 | 0 |
| 1 | CH1 | 5/25/10 7:36 AM | U4 | A1_Value1 | A2_Value1 | A3_Value1 | A4_Value1 | 0 |
| 2 | CH1 | 5/23/10 9:23 AM | U4 | A1_Value2 | A2_Value2 | A3_Value1 | A4_Value1 | 0 |
| 3 | CH1 | 5/20/10 9:31 PM | U4 | A1_Value4 | A2_Value2 | A3_Value5 | A4_Value6 | 0 |
| 4 | CH1 | 5/19/10 11:34 AM | U4 | A1_Value3 | A2_Value5 | A3_Value2 | A4_Value6 | 0 |

FIG. 11A

| ID | Channel | TimeStamp | UserID | Attribute1 | Attribute2 | Attribute3 | Attribute4 | Conversion |
|---|---|---|---|---|---|---|---|---|
| 1 | CH2 | 5/24/10 12:54 AM | U1 | A1_Value1 | A2_Value1 | A3_Value1 | A4_Value1 | 0 |
| 2 | CH2 | 5/18/10 3:18 AM | U1 | A1_Value1 | A2_Value4 | A3_Value4 | A4_Value5 | 0 |
| 3 | CH2 | 5/16/10 4:46 AM | U1 | A1_Value1 | A2_Value2 | A3_Value3 | A4_Value3 | 0 |
| 4 | CH2 | 5/10/10 11:28 AM | U1 | A1_Value4 | A2_Value2 | A3_Value5 | A4_Value6 | 1 |
| 1 | CH2 | 5/23/10 10:05 PM | U5 | A1_Value1 | A2_Value1 | A3_Value3 | A4_Value3 | 0 |
| 2 | CH2 | 5/21/10 9:48 PM | U5 | A1_Value2 | A2_Value2 | A3_Value1 | A4_Value4 | 0 |
| 3 | CH2 | 5/21/10 7:28 PM | U5 | A1_Value3 | A2_Value2 | A3_Value4 | A4_Value1 | 0 |
| 4 | CH2 | 5/19/10 1:16 PM | U5 | A1_Value2 | A2_Value2 | A3_Value1 | A4_Value5 | 0 |
| 5 | CH2 | 5/12/10 1:27 AM | U5 | A1_Value4 | A2_Value4 | A3_Value5 | A4_Value6 | 0 |
| 6 | CH2 | 5/8/10 7:36 AM | U5 | A1_Value1 | A2_Value5 | A3_Value4 | A4_Value1 | 0 |
| 7 | CH2 | 5/8/10 3:41 AM | U5 | A1_Value3 | A2_Value5 | A3_Value2 | A4_Value6 | 0 |
| 8 | CH2 | 4/29/10 1:01 PM | U5 | A1_Value1 | A2_Value1 | A3_Value2 | A4_Value1 | 0 |
| 1 | CH2 | 5/23/10 8:08 AM | U2 | A1_Value3 | A2_Value5 | A3_Value1 | A4_Value6 | 0 |
| 2 | CH2 | 5/23/10 12:23 AM | U2 | A1_Value2 | A2_Value4 | A3_Value2 | A4_Value3 | 0 |
| 3 | CH2 | 5/15/10 8:14 PM | U2 | A1_Value4 | A2_Value2 | A3_Value4 | A4_Value5 | 0 |
| 4 | CH2 | 5/12/10 11:10 AM | U2 | A1_Value4 | A2_Value2 | A3_Value5 | A4_Value6 | 0 |
| 5 | CH2 | 5/4/10 9:42 PM | U2 | A1_Value2 | A2_Value2 | A3_Value1 | A4_Value1 | 0 |

FIG. 11B

| CaseID | ID | Channel | TimeStamp | UserID | Attribute1 | Attribute2 | Attribute3 | Attribute4 | Assists |
|---|---|---|---|---|---|---|---|---|---|
| 1 | 1 | CH1 | 5/24/10 8:38 PM | U1 | A1_Value1 | A2_Value4 | A3_Value4 | A4_Value5 | 1 |
| 2 | 2 | CH1 | 5/23/10 7:45 AM | U1 | A1_Value1 | A2_Value1 | A3_Value1 | A4_Value1 | 1 |
| 3 | 3 | CH1 | 5/23/10 7:23 AM | U1 | A1_Value4 | A2_Value2 | A3_Value5 | A4_Value6 | 1 |
| 4 | 4 | CH1 | 5/17/10 12:47 PM | U1 | A1_Value3 | A2_Value5 | A3_Value2 | A4_Value6 | 1 |
| 5 | 5 | CH1 | 5/15/10 5:04 AM | U1 | A1_Value3 | A2_Value2 | A3_Value4 | A4_Value4 | 1 |
| 6 | 6 | CH1 | 5/3/10 11:10 PM | U1 | A1_Value1 | A2_Value2 | A3_Value3 | A4_Value3 | 1 |
| 7 | 7 | CH1 | 5/2/10 10:14 PM | U1 | A1_Value2 | A2_Value1 | A3_Value1 | A4_Value3 | 1 |
| 8 | 1 | CH2 | 5/24/10 12:54 AM | U1 | A1_Value1 | A2_Value1 | A3_Value1 | A4_Value1 | 1 |
| 9 | 2 | CH2 | 5/18/10 3:18 AM | U1 | A1_Value1 | A2_Value4 | A3_Value4 | A4_Value5 | 1 |
| 10 | 3 | CH2 | 5/16/10 4:46 AM | U1 | A1_Value1 | A2_Value2 | A3_Value3 | A4_Value3 | 1 |
| 11 | 4 | CH2 | 5/10/10 11:28 AM | U2 | A1_Value4 | A2_Value2 | A3_Value5 | A4_Value6 | 1 |
| 12 | 1 | CH1 | 5/23/10 6:07 PM | U2 | A1_Value4 | A2_Value2 | A3_Value5 | A4_Value6 | 1 |
| 13 | 2 | CH1 | 5/22/10 9:51 AM | U2 | A1_Value3 | A2_Value5 | A3_Value2 | A4_Value6 | 1 |
| 14 | 3 | CH1 | 5/17/10 10:48 AM | U2 | A1_Value3 | A2_Value2 | A3_Value4 | A4_Value41 | 1 |
| 15 | 4 | CH1 | 5/15/10 11:15 AM | U2 | A1_Value1 | A2_Value2 | A3_Value3 | A4_Value3 | 1 |
| 16 | 5 | CH1 | 5/11/10 5:48 AM | U2 | A1_Value2 | A2_Value1 | A3_Value1 | A4_Value3 | 1 |
| 17 | 1 | CH2 | 5/23/10 8:08 AM | U2 | A1_Value3 | A2_Value5 | A3_Value2 | A4_Value6 | 1 |
| 18 | 2 | CH2 | 5/23/10 12:23 AM | U2 | A1_Value2 | A2_Value1 | A3_Value1 | A4_Value3 | 1 |
| 19 | 3 | CH2 | 5/15/10 8:14 PM | U2 | A1_Value1 | A2_Value4 | A3_Value4 | A4_Value5 | 1 |
| 20 | 4 | CH2 | 4/12/10 11:10 AM | U2 | A1_Value14 | A2_Value2 | A3_Value5 | A4_Value6 | 1 |
| 21 | 5 | CH2 | 5/4/10 9:42 PM | U3 | A1_Value2 | A2_Value2 | A3_Value1 | A4_Value1 | 1 |
| 22 | 1 | CH1 | 5/22/10 8:37 AM | U3 | A1_Value1 | A2_Value2 | A3_Value3 | A4_Value3 | 0 |
| 23 | 2 | CH1 | 5/19/10 9:29 PM | U3 | A1_Value2 | A2_Value1 | A3_Value1 | A4_Value3 | 0 |
| 24 | 3 | CH1 | 5/15/10 2:57 PM | U3 | A1_Value2 | A2_Value2 | A3_Value1 | A4_Value1 | 0 |
| 25 | 4 | CH1 | 5/12/10 10:33 PM | U3 | A1_Value1 | A2_Value4 | A3_Value4 | A4_Value5 | 0 |
| 26 | 5 | CH1 | 4/27/10 11:47 PM | U3 | A1_Value4 | A2_Value2 | A3_Value5 | A4_Value6 | 0 |
| 27 | 6 | CH1 | 4/26/10 1:53 PM | U3 | A1_Value3 | A2_Value5 | A3_Value2 | A4_Value6 | 0 |
| 28 | 7 | CH1 | 4/25/10 8:30 AM | U4 | A1_Value3 | A2_Value2 | A3_Value4 | A4_Value4 | 0 |
| 29 | 1 | CH1 | 5/25/10 7:36 AM | U4 | A1_Value1 | A2_Value4 | A3_Value4 | A4_Value5 | 0 |
| 30 | 2 | CH1 | 5/23/10 9:23 AM | U4 | A1_Value1 | A2_Value1 | A3_Value1 | A4_Value1 | 0 |
| 31 | 3 | CH1 | 5/20/10 9:31 PM | U4 | A1_Value4 | A2_Value2 | A3_Value5 | A4_Value6 | 0 |
| 32 | 4 | CH1 | 5/19/10 11:34 AM | U4 | A1_Value3 | A2_Value5 | A3_Value2 | A4_Value6 | 0 |
| 33 | 5 | CH1 | 5/18/10 9:41 PM | U4 | A1_Value3 | A2_Value2 | A3_Value4 | A4_Value4 | 0 |
| 34 | 6 | CH1 | 5/14/10 2:11 PM | U4 | A1_Value1 | A2_Value2 | A3_Value63 | A4_Value3 | 0 |
| 35 | 7 | CH1 | 5/10/10 6:05 PM | U5 | A1_Value2 | A2_Value1 | A3_Value1 | A4_Value3 | 0 |
| 36 | 1 | CH2 | 5/23/10 10:05 PM | U5 | A1_Value1 | A2_Value2 | A3_Value3 | A4_Value3 | 1 |
| 37 | 2 | CH2 | 5/21/10 9:48 PM | U5 | A1_Value2 | A2_Value1 | A3_Value1 | A4_Value3 | 1 |
| 38 | 3 | CH2 | 5/21/10 7:28 PM | U5 | A1_Value3 | A2_Value2 | A3_Value4 | A4_Value4 | 1 |
| 39 | 4 | CH2 | 5/19/10 1:16 PM | U5 | A1_Value2 | A2_Value2 | A3_Value1 | A4_Value1 | 1 |
| 40 | 5 | CH2 | 5/12/10 1:27 AM | U5 | A1_Value4 | A2_Value2 | A3_Value5 | A4_Value6 | 1 |
| 41 | 6 | CH2 | 5/8/10 7:36 AM | U5 | A1_Value1 | A2_Value4 | A3_Value4 | A4_Value5 | 1 |
| 42 | 7 | CH2 | 5/8/10 3:41 AM | U5 | A1_Value3 | A2_Value5 | A3_Value2 | A4_Value6 | 1 |
| 43 | 8 | CH2 | 4/29/10 1:01 PM | U5 | A1_Value1 | A2_Value1 | A3_Value1 | A4_Value1 | 1 |

FIG. 11C

| ID | Channel | TimeStamp | UserID | Attribute1 | Attribute2 | Attribute3 | Attribute4 | Conversion | True Conversion |
|---|---|---|---|---|---|---|---|---|---|
| 1 | CH1 | 5/24/10 8:38 PM | U1 | A1_Value1 | A2_Value4 | A3_Value4 | A4_Value5 | 1 | |
| 2 | CH1 | 5/23/10 7:45 AM | U1 | A1_Value1 | A2_Value1 | A3_Value1 | A4_Value1 | 0 | |
| 3 | CH1 | 5/23/10 7:23 AM | U1 | A1_Value4 | A2_Value2 | A3_Value5 | A4_Value6 | 0 | |
| 4 | CH1 | 5/17/10 12:47 PM | U1 | A1_Value3 | A2_Value5 | A3_Value2 | A4_Value6 | 0 | |
| 5 | CH1 | 5/15/10 5:04 AM | U1 | A1_Value3 | A2_Value2 | A3_Value4 | A4_Value4 | 0 | |
| 6 | CH1 | 5/3/10 11:10 PM | U1 | A1_Value1 | A2_Value2 | A3_Value3 | A4_Value3 | 0 | |
| 7 | CH1 | 5/2/10 10:14 PM | U1 | A1_Value2 | A2_Value1 | A3_Value1 | A4_Value3 | 0 | |
| 1 | CH2 | 5/24/10 12:54 PM | U1 | A1_Value1 | A2_Value1 | A3_Value1 | A4_Value1 | 0 | |
| 2 | CH2 | 5/18/10 3:18 AM | U1 | A1_Value1 | A2_Value4 | A3_Value4 | A4_Value5 | 0 | |
| 3 | CH2 | 5/16/10 4:46 AM | U1 | A1_Value1 | A2_Value2 | A3_Value3 | A4_Value3 | 0 | |
| 4 | CH2 | 5/10/10 11:28 AM | U1 | A1_Value4 | A2_Value2 | A3_Value5 | A4_Value6 | 0 | |
| 1 | CH1 | 5/23/10 6:07 PM | U2 | A1_Value4 | A2_Value2 | A3_Value5 | A4_Value6 | 1 | |
| 2 | CH1 | 5/22/10 9:51 AM | U2 | A1_Value3 | A2_Value5 | A3_Value2 | A4_Value6 | 0 | |
| 3 | CH1 | 5/17/10 10:48 AM | U2 | A1_Value3 | A2_Value1 | A3_Value4 | A4_Value4 | 0 | |
| 4 | CH1 | 5/15/10 11:15 AM | U2 | A1_Value2 | A2_Value2 | A3_Value3 | A4_Value3 | 0 | |
| 5 | CH1 | 5/11/10 5:48 AM | U2 | A1_Value3 | A2_Value5 | A3_Value1 | A4_Value3 | 0 | |
| 1 | CH2 | 5/23/10 8:08 AM | U2 | A1_Value3 | A2_Value1 | A3_Value2 | A4_Value6 | 0 | |
| 2 | CH2 | 5/23/10 12:23 AM | U2 | A1_Value2 | A2_Value2 | A3_Value1 | A4_Value3 | 0 | |
| 3 | CH2 | 5/15/10 8:14 PM | U2 | A1_Value1 | A2_Value4 | A3_Value4 | A4_Value5 | 0 | |
| 4 | CH2 | 5/12/10 11:10 AM | U2 | A1_Value2 | A2_Value2 | A3_Value5 | A4_Value6 | 0 | |
| 5 | CH2 | 5/4/10 9:42 PM | U2 | A1_Value2 | A2_Value2 | A3_Value1 | A4_Value3 | 1 | |
| 1 | CH2 | 5/23/10 10:05 PM | U5 | A1_Value2 | A2_Value2 | A3_Value3 | A4_Value3 | 0 | |
| 2 | CH2 | 5/21/10 9:48 PM | U5 | A1_Value2 | A2_Value1 | A3_Value1 | A4_Value1 | 0 | |
| 3 | CH2 | 5/21/10 7:28 PM | U5 | A1_Value3 | A2_Value2 | A3_Value1 | A4_Value3 | 0 | |
| 4 | CH2 | 5/19/10 1:16 PM | U5 | A1_Value2 | A2_Value2 | A3_Value4 | A4_Value1 | 0 | |
| 5 | CH2 | 5/12/10 1:27 AM | U5 | A1_Value4 | A2_Value2 | A3_Value5 | A4_Value6 | 0 | |
| 6 | CH2 | 5/8/10 7:36 AM | U5 | A1_Value1 | A2_Value4 | A3_Value4 | A4_Value5 | 0 | |
| 7 | CH2 | 5/8/10 3:41 AM | U5 | A1_Value3 | A2_Value5 | A3_Value2 | A4_Value6 | 0 | |
| 8 | CH2 | 4/29/10 1:01 PM | U5 | A1_Value1 | A2_Value1 | A3_Value1 | A4_Value1 | 0 | |

FIG. 11D

METHOD AND SYSTEM FOR DETERMINING TOUCHPOINT ATTRIBUTION

FIELD OF THE INVENTION

The embodiments disclosed herein relate to bottom up attribution. Specifically, the embodiments disclosed herein comprise a procedure for determining the influence of various advertising touchpoints on a consumer conversion.

BACKGROUND

Advertising, the practice of promoting a product or service to a particular audience or to the public at large, has changed significantly over the years. Initially, advertising consisted of little more than simple posters or crude messages scrawled on public posting walls. As technology has evolved, however, so too has advertising. The advent of radio and television has allowed advertisers to develop creative messages comprising sound, video, and rich media that can be delivered to consumers as they sit in the privacy of their own homes. The emergence of the Internet has enabled the delivery of interactive advertising that can be presented on multiple platforms and the response to which can be immediately and definitively determined. Perhaps more significantly, the diversification of advertising into private spaces and multiple mediums of communication has allowed advertisers to craft messages that are tailored to a particular medium and audience.

This has also presented advertisers with the task of determining how advertising money and resources should be allocated. Companies often prefer to place advertisements for the same product, service, or brand across multiple mediums of communication (i.e., channels). Because different media outlets have different effectiveness in delivering different types of messages, an advertisement for the same product may generate a bigger response in one channel than another. The effectiveness of an advertisement may further depend on additional factors such as the time of day during which it appeared, the day of the week on which it appeared, and even the weather. Given limited resources and budgets, advertisers must make intelligent decisions about which forms of advertising to focus on and how the advertisements should be placed.

Thus, what is needed is a technique for identifying the various advertisements encountered by potential consumers and assigning credit for a purchase in a manner that accounts for each advertisement's influence on the consumer's purchasing decision. As will be shown, the embodiments disclosed herein provide such a technique in an elegant manner.

SUMMARY

A computer implemented method allocates credit for conversions among a plurality of advertising touchpoints. A plurality of touchpoint encounters and a plurality of conversions are received. The touchpoint encounters comprise a plurality of attributes and the attributes comprise a plurality of attribute values. The touchpoint encounters and the conversions are correlated to a plurality of users. The users comprise a plurality of converting users correlated to a plurality of assisting touchpoints from among the touchpoint encounters. A plurality of attribute weights are assigned to the attributes of the assisting touchpoints. Also, a plurality of attribute value weights are assigned to the attribute values of the attributes of the assisting touchpoints. A plurality of true scores, which correspond to the assisting touchpoints, are determined using the attribute weights and the attribute value weights. An attribution apportionment is assigned to the assisting touchpoints using the true scores.

BRIEF DESCRIPTION OF THE DRAWINGS

FIG. 3 is a chart illustrating the weights of example attribute values.

FIG. 11A depicts a table illustrating the operation of the procedure according to an embodiment.

FIG. 11B depicts a table illustrating the operation of the procedure according to an embodiment.

FIG. 11C depicts a table illustrating the operation of the procedure according to an embodiment.

FIG. 11D depicts a table illustrating the operation of the procedure according to an embodiment.

DETAILED DESCRIPTION

Figure 1:
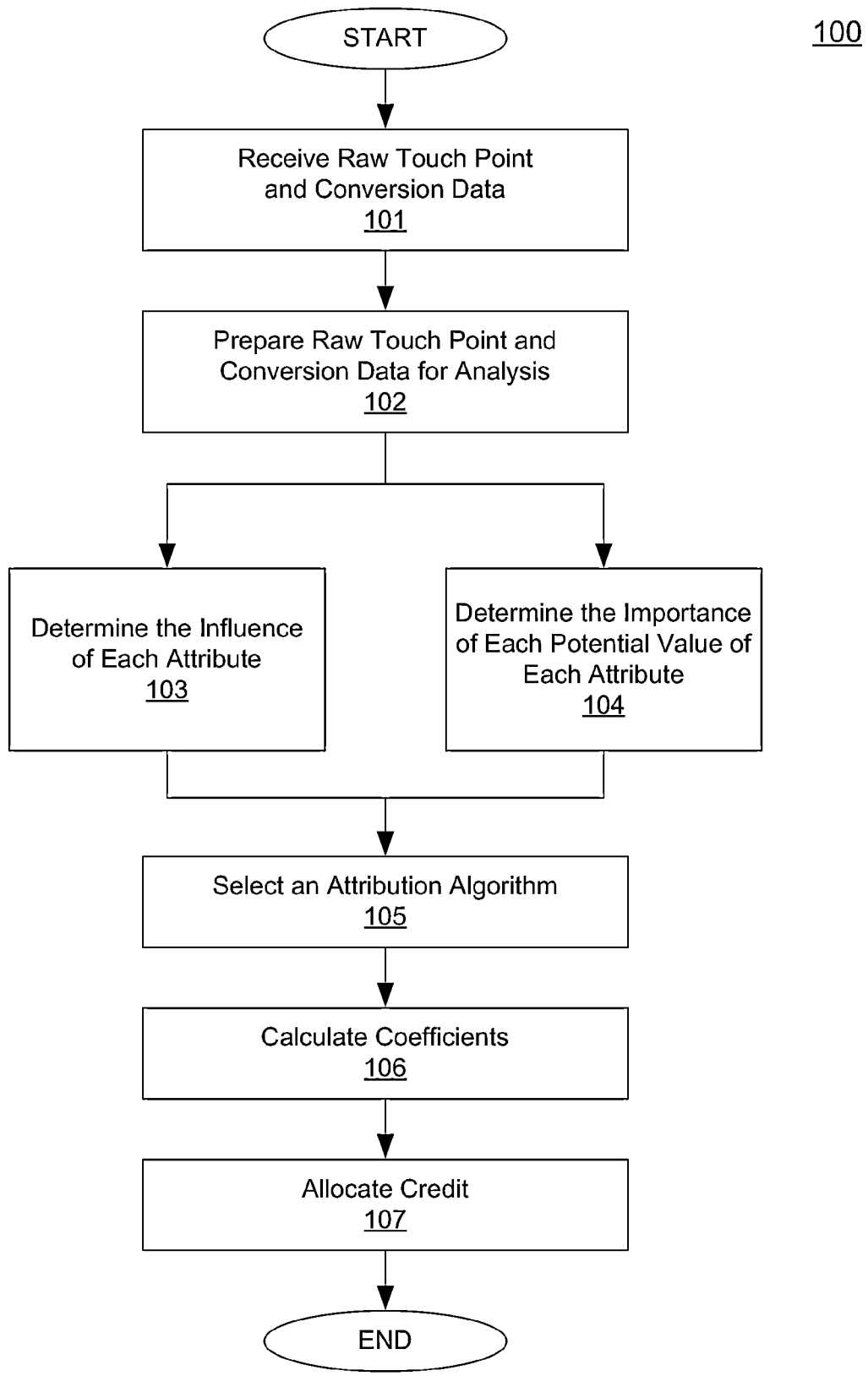
FIG. 1 depicts a flow diagram illustrating the operation of the procedure according to an embodiment.

Attribution, the process of allocating credit among advertisements for a purchase, has become a critical tool for advertisers. In today's media-rich environment, a consumer may encounter multiple advertisements for the same product across a variety of different mediums. Advertisers and companies often wish to determine and quantify the effectiveness of various forms of advertising. This has highlighted the need for sophisticated analytics to identify which advertisement (i.e., a touchpoint) most influenced a specific consumer's decision to purchase an advertised product or service (i.e., a conversion) and which characteristics of that advertisement (i.e., attributes) were most crucial to its effectiveness. By analyzing the collective data of advertising touchpoints and consumer conversions, advertisers can determine the attributes associated with an advertisement (e.g., placement, frequency, target audience, etc) and the allocation of advertising resources between channels (e.g., breakdown of advertising expenditures between print, television, radio, internet, etc) that yield optimal conversion rates. This process is known as attribution. Attribution is a methodology for measuring, quantifying, and assigning due credit to each of these touchpoints in a manner that reflects the touchpoint's influence upon the consumer. Thus, attribution provides an advertiser with a detailed perspective on the effectiveness of different forms of advertising Previously, attribution consisted primarily of simplistic rules of thumb by which all of the credit for a conversion was assigned to the last touchpoint encountered by a consumer prior to the conversion. These techniques are imprecise and misleading because they assume that the most recent touchpoint encountered by a consumer or the touchpoint that directly lead to a conversion is more important than others whose effect may be more subtle but equally powerful. For example, one such technique, last-click attribution, assigns 100% of the credit for an online conversion to the advertisement clicked on by a user that ultimately led the user to make a purchase. Thus, last-click attribution may lead an advertiser to disregard print advertisements, television advertisements, or other touchpoints that may have influenced the user to click on the online advertisement he encountered and eventually make a purchase. Resource allocation decisions based on such techniques may disproportionately favor online advertisements over other mediums. Conversions resulting from online searches are particularly illustrative of this problem; if all of the credit for a conversion resulting from an online search is assigned to an advertisement on the search results page, the advertising touchpoints that influenced the user to run the search to begin with are completely neglected.

Touchpoints may be classified into three categories: introducers, influencers, and converters. Introducers provide the first exposure of a brand, product, or promotion to a consumer. For example, an advertiser may run a television advertisement announcing a new line of products during the Super Bowl. An influencer keeps the advertised brand, product, or promotion at the forefront of the consumer's consciousness. For example, an advertiser may produce advertisements featuring an endorsement by a popular celebrity in order to strengthen a brand's reputation or cultivate a positive association in the mind of the consumer. Converters directly provoke a user to purchase the advertised product or service. For example, an Internet banner advertisement may offer a discount to consumers who purchase the advertised product by clicking the advertisement. Each of these types of touchpoints has unique strengths and weaknesses and is a necessary component of a successful advertising strategy. Internet banner advertisements may be excellent converters but are typically not effective introducers or influencers. Conversely, television advertisements may be effective introducers and influencers but poor converters.

According to simple attribution methodologies, the most recent advertisement the consumer encounters prior to purchasing an advertised product—i.e., the converter—is often thought of as the touchpoint most responsible for the conversion. This causes many advertisers to devote a disproportionate share of advertising money and resources to converters. For example, many online conversions can be directly traced to search advertisements, which consumers may encounter upon searching for a particular product or type of product using an Internet search engine. According to last-click attribution, an attribution methodology in which all of the credit for a conversion is assigned to the last-encountered touchpoint, a search advertisement would receive 100% of the credit for the conversion. However, the consumer's decision to run the search, and hence the consumer's decision to make a purchase, is actually influenced by all of the touchpoints he encountered prior to the conversion, not just the search advertisement. Thus, a more nuanced attribution methodology that properly accounts for and quantifies the effect of the various touchpoints encountered by a user would be desirable. With a nuanced attribution methodology, an advertiser can develop an advertising strategy with an optimal balance of introducers, influencers, and converters.

The embodiments disclosed herein provide such a nuanced attribution methodology by utilizing machine learning techniques to determine the effect of various touchpoints on a consumer's purchasing habits. Most advertising campaigns comprise multiple advertising touchpoints that appear across different channels (e.g., print, television, Internet, radio, etc.). Each of these advertising touchpoints comprises a number of attributes. For example, the time of day during which the advertisement appeared, the frequency with which it was repeated, and the type of offer being advertised are all attributes of any advertising touchpoint.

According to one embodiment, all of the users who encountered the various touchpoints of an advertising campaign are identified. The users are divided between those who converted and those who did not, and the attributes of each touchpoint encountered by the user are identified. Similarly, all of the users who converted are identified. For each touchpoint, this set of users is divided between those who encountered the touchpoint and those who did not. Using this data, the importance of each attribute of the various advertising touchpoints is determined, and the attributes of each touchpoint are ranked according to importance. Similarly, for each attribute of each touchpoint, the likelihood that a potential value of that attribute might influence a conversion is determined. An attribution algorithm is selected and coefficients for the algorithm are computed based on this information. The algorithm is executed to determine the relative influence of each touchpoint upon each conversion.

In another embodiment, multiple attributes of the touch points are combined to create a composite attribute. For example all possible permutations of the placement and creative of the touch points may be combined to create a single composite attribute.

The technique of the present disclosure according to an embodiment is illustrated in further detail by the flow diagram 100 depicted in FIG. 1. At step 101, raw touchpoint and conversion data is received. According to one embodiment, the data may be received separately for each channel. The data may pertain to various touchpoints comprising an advertising campaign and the consumers who encountered each touchpoint. The data may include entries that list each instance of a consumer's encounter with a touchpoint and whether or not that consumer converted. The data may be gathered from a variety of sources. Internet advertising impressions are easy to track, since every instance of an advertisement being served to a user and the user clicking on the advertisement is recorded in server-side logs. Conversion data pertaining to television, radio, or print advertising may be obtained from research and analytics agencies or other external entities that specialize in the collection of such data. Any means of gathering or obtaining touchpoint and conversion data may be used without deviating from the spirit or scope of the invention.

At step 102, the raw touchpoint and conversion data is prepared for analysis. To be utilized by one embodiment, the touchpoint and conversion data is grouped, shuffled, or organized into sets of entries. The entries may be grouped according to touchpoint, user, campaign, or any other scheme that facilitates ease of analysis according to embodiments of the invention. Any technique or scheme for preparing the data may be used without deviating from the spirit or scope of the invention.

At step 103, for each touchpoint, the most important attributes of that touchpoint are determined using the data prepared in step 102. An advertising touchpoint may have numerous attributes ranging from obvious (e.g., time of day, frequency, income of viewer, etc) to subtle (e.g., weather, month of the year, relevance of advertisement to the day's news cycle, etc). However, not all of these attributes influence the effectiveness of an advertisement. An advertisement may have the same effect on viewers irrespective of the type of publication, television program, or website within which they encounter it. However, the viewers' receptiveness to the advertisement may vary greatly according to, for example, the day of the week on which they encounter it. Thus, in step 103, the influence of each attribute on the effectiveness of an advertising touchpoint is determined.

According to one embodiment, attribute importance may be modeled, using machine-learning techniques, to generate weights that are assigned to each attribute. In some embodiments, the weights are determined by comparing data pertaining to converting users and non-converting users. In other embodiments, the importance of each attribute may be determined by comparing conversions to the frequency of exposures to touch points with that attribute relative to others. However, any technique for modeling or determining attribute importance may be used without deviating from the spirit or scope of the invention.

Each attribute of a touchpoint may have a range of values. This range may be fixed or variable. For example, the range of values for a day of the week attribute would be seven, whereas the range of values for a weather attribute may depend on the level of specificity desired. The values may be objective (e.g., timestamp) or subjective (e.g., the relevance of the advertisement to the day's news cycle). At step 104, in parallel with determining the influence of each attribute, the importance of each potential value of each attribute of each touchpoint is determined using the data prepared in step 102. The importance of each potential value of an attribute corresponds to the likelihood of that value leading to a conversion. For example, viewers may be much more receptive to an advertisement if they encounter it on a Monday than if they encounter it on a Wednesday. Thus, for a day of the week attribute, the Monday value would be assigned a greater importance than the Wednesday value. According to one embodiment, using machine-learning techniques, weights are generated and assigned to each attribute value by comparing data pertaining to converters and non-converters. However, any technique for modeling or determining attribute value importance may be used without deviating from the spirit or scope of the invention.

At steps 105 and 106, an attribution algorithm is selected and coefficients are assigned for the algorithm, respectively, using the weights determined in steps 103 and 104. The relative effect of each touchpoint in influencing each conversion can be identified using machine-learning techniques, according to some embodiments. In some embodiments, logistic regression techniques are used to determine the influence of each attribute and to determine the importance of each potential value of each attribute. Any machine-learning algorithm may be used without deviating from the spirit or scope of the invention. At step 107, the algorithm selected at step 105 is executed using the coefficients or weights calculated at steps 103 and 104. According to one embodiment, for each conversion, the attribution algorithm outputs a score for every touchpoint that a user encountered prior to converting, wherein the score represents the touchpoint's relative influence on the user's decision to convert. At step 108, credit is allocated to the various touchpoints for each conversion in accordance with the algorithm output. In some embodiments, to allocate attribution across the touchpoints, the scores are summed and normalized as a percentage. For example, four touchpoints ($TP_1$, $TP_2$, $TP_3$ and $TP_4$) may have raw scores of 80, 100, 150 and 20, respectively. For this example, attribution, as a percentage, is assigned to the touchpoints as follows: $TP_1$=22.85%, $TP_2$=28.58%, $TP_3$=42.86% and $TP_4$=5.71%.

Figure 2:
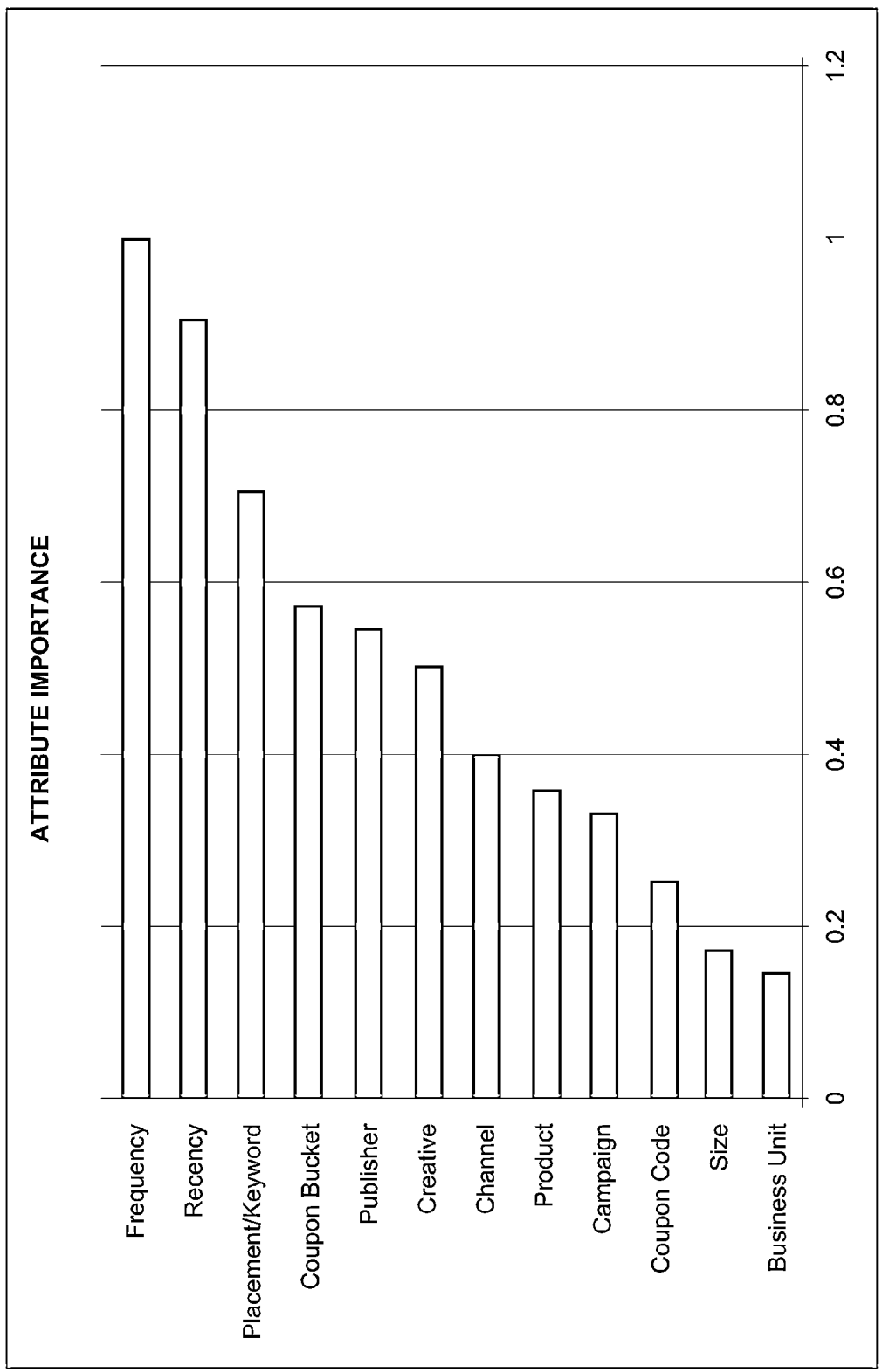
FIG. 2 is a chart illustrating the importance of example attributes.

FIG. 2 is a chart illustrating the importance of example attributes. For this example, several attributes are listed (e.g., "Frequency", "Recency", "Placement/Keyword", "Coupon Bucket", "Publisher", "Creative", "Channel", "Product", "Campaign", "Coupon Code", "Size" and "Business Unit"). As discussed above, the attribute importance weight ascribes a value to the attribute that measures the importance of the attribute with regard to a conversion. For example, the importance of the "Publisher" attribute measures the importance of the publisher of an advertisement to a conversion. For the example of FIG. 2, the attributes are listed in descending order of importance such that the "Frequency" attribute is the most important and the "Business Unit" attribute is the least importance in their respective contribution in determining a conversion. To this end, the attributes are assigned weights to quantify their relative importance. For the example shown in FIG. 2, the "frequency" attribute has a weight of "1", and the "Business Unit" attribute has a weight less than "0.2." Although in the example of FIG. 2 the weights for the importance of the attributes are normalized between "0" and "1", the weights may be scaled to any range without deviating from the spirit or scope of the invention.

FIG. 3 is a chart illustrating the weights of example attribute values. For this example, chart 310 identifies attribute values for the "Publisher" attribute. As discussed above, some values of an attribute may have more significance in influencing a conversion than other values. As such, some attribute values, when encountered by a user, are weighted more heavily than others in touchpoint analysis. As shown in chart 310 of FIG. 3, for the "Publisher" attribute example, some of the attribute values are "Yahoo! Inc.", "WSI.com", "Seeking Alpha", "NY Times Online", "CBS Matchwatch", "MSN Money", "CBS Interactive", "YuMe" and "IH Remnant." As shown in the example of chart 310, the largest lift from the Publisher attribute is ascribed to the publisher "Yahoo, Inc." and the smallest lift for the publisher attribute is ascribed to the value "IH Remnant." Similarly, chart 320 of FIG. 3 illustrates the "lift" generated by certain advertisement creatives for the "Creative" attribute. For this example, the creatives are identified by file name. The creative value "MOX_1_Plate 300×250 swf" creates the greatest lift for the "Creative" attribute while the creative value "4-FE15_SP_Introducing" creates the lowest lift for the "Creative" attribute.

Figure 4:
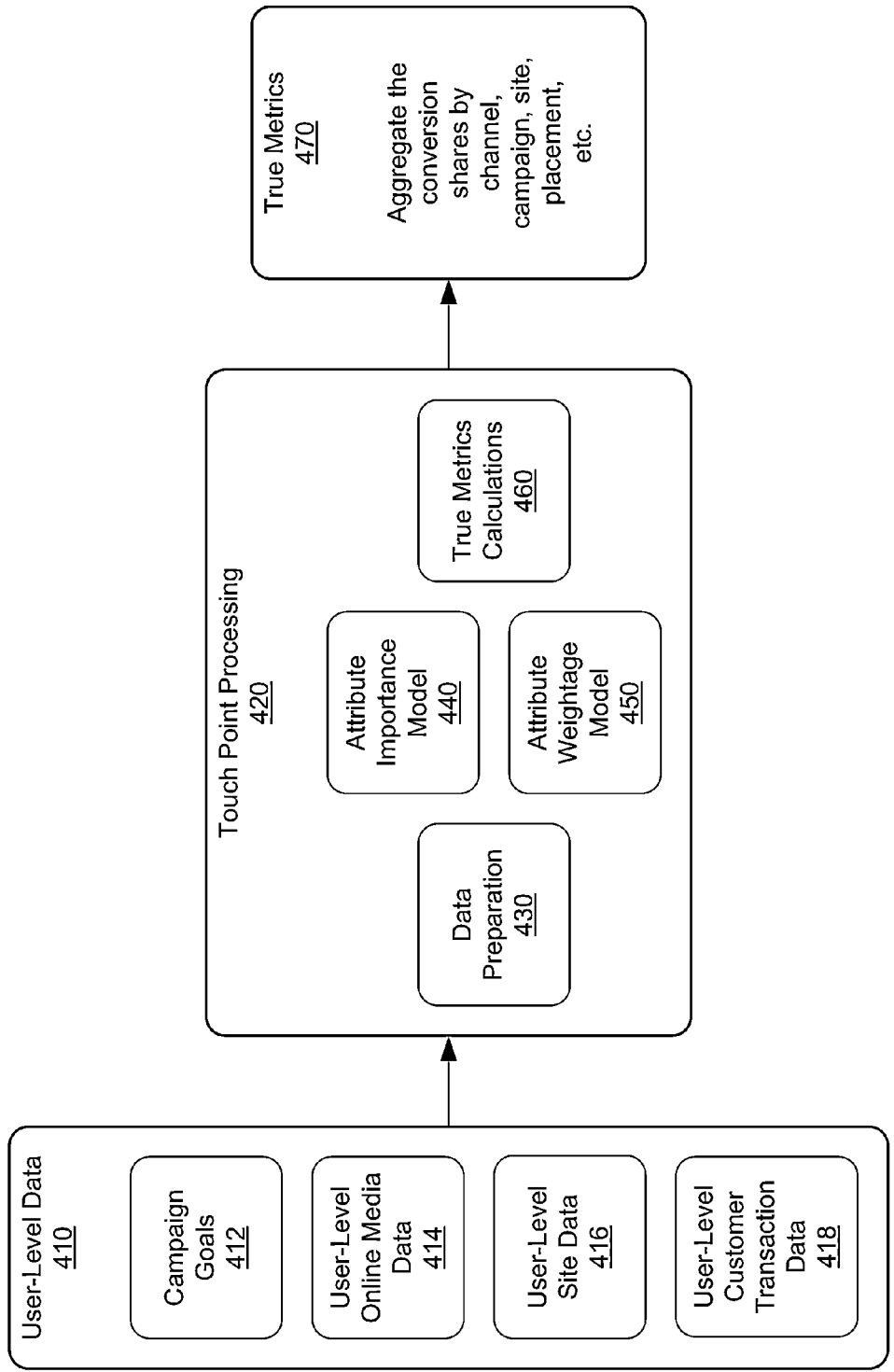
FIG. 4 is a block diagram illustrating one embodiment of the bottom-up attribution in accordance with one embodiment.

FIG. 4 is a block diagram illustrating one embodiment of the bottom-up attribution in accordance with one embodiment. The bottom-up attribution process includes accumulating touchpoint and conversion data for analysis (block 102, FIG. 1). User-level data 401 of FIG. 4 illustrates various types of data for input to touchpoint processing. For this embodiment, user-level data comprises "Campaign Goals" 412, "User-level Online Media Data" 414, "User-level Site Data" 416 and "User-level Customer Transaction Data" 418. Although the embodiment of FIG. 4 illustrates four types of data for input to touchpoint processing, other types of data may be integrated in the system without deviating from the spirit or scope of the invention. In some embodiments, the User-level Data 410 may be stored in one or more databases and loaded into memory of a computer system for processing by one or more processors.

Touchpoint processing 420, receives as input, User-level data 410, and generates, as output, true metric calculations for the various touchpoints. The data is processed in data preparation module 430 for input to the attribute importance model 440 and the attribute weight age model 450. The attribute importance model 440 and the attribute weightage model 450 are trained, using machine-learning techniques, to assign weights to attributes (attribute importance model 440) and to attribute values (attribute weightage model 450). The data preparation 430 outputs, for each touchpoint, a plurality of attributes and attribute values associated with the corresponding touchpoints. In turn, the attribute importance model 440 assigns weights to those attributes of the touchpoint in accordance with the model, and the attribute weightage model 450 assigns weights to attribute values of the touchpoint in accordance with the model. The true metrics calculation model 460 calculates a true score for each touchpoint based on an attribution model. The true scores, output from the true metrics calculations 460, are input to the true metrics 470. The true metrics 470 aggregates the conversion among the touchpoints encountered by the user.

Figure 5:
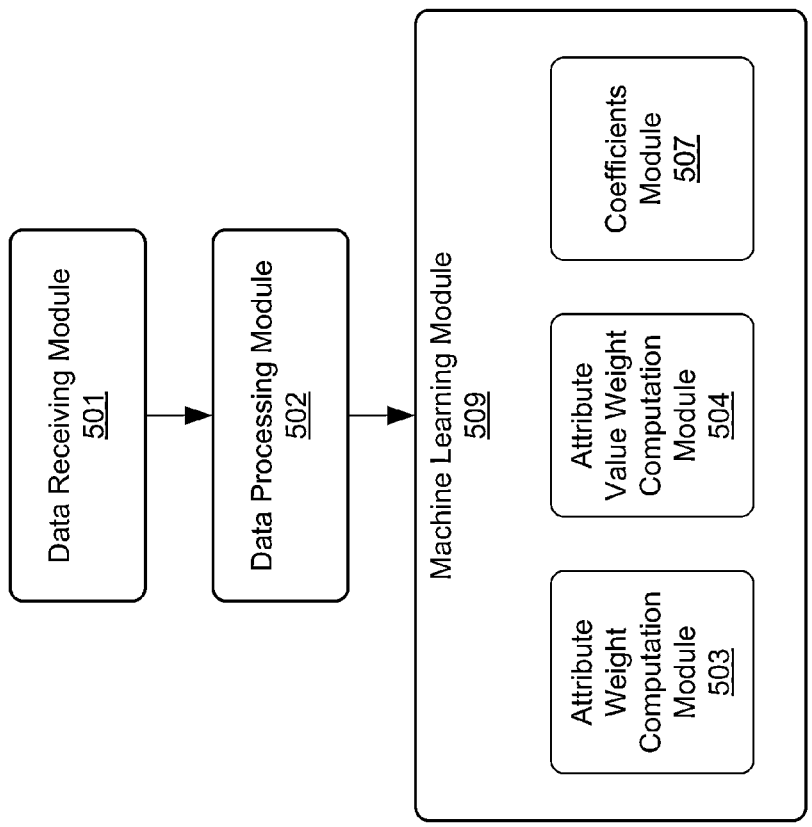
FIG. 5 illustrates a block diagram 500 illustrating one embodiment of the present technique.

FIG. 5 illustrates a block diagram 500 illustrating one embodiment of the present technique. Block diagram 500 illustrates modules to train models for use in bottom-up attribution processing. In some embodiments, the modules are implemented with one or more processors and memory (See FIG. 13). For the embodiment shown in FIG. 5, the unit includes a Data Receiving module 501, at which conversion and touchpoint data from third parties or other external entities is received. In general, Data Processing Module 502 sorts correlates, and reorganizes the data for analysis. The data (e.g., training data set), from the data processing module 502, is input to machine learning module 509. The attribute weight computation module 503 is trained, using the input data and a machine learning technique, to generate the weights for the attributes. Similarly, the attribute value weight computation module 504 is also trained, using the input data and a machine learning technique, to generate the attribute value weights. In one embodiment, the attribute weight computation module 503 and the attribute value weight computation module 504 utilize a logistic regression technique to generate the weights from the training data set. In general, logistic regression is a type of regression analysis used to generate correlations between variables and a binary result. For this embodiment, the logistic regression algorithm is used to correlate the attributes, and the attribute values, associated with each touchpoint, exposed to a user to a conversion or non-conversion of the user. For this embodiment, the logistic regression utilizes a binomial or binary logistic regression technique to determine whether the attribute and/or attribute value contributes to a conversion or a non-conversion.

The machine-learning module 509 also include coefficient module 507. Similar to the attribute weight computation module 503 and the attribute value weight computation module 504, the coefficient module 507 uses a machine learning technique to compute the coefficients for the attribution algorithm. Specifically, a machine learning technique (e.g., logistic regression) is applied to a training set in order to determine the coefficients for the attribution algorithm.

Figure 6:
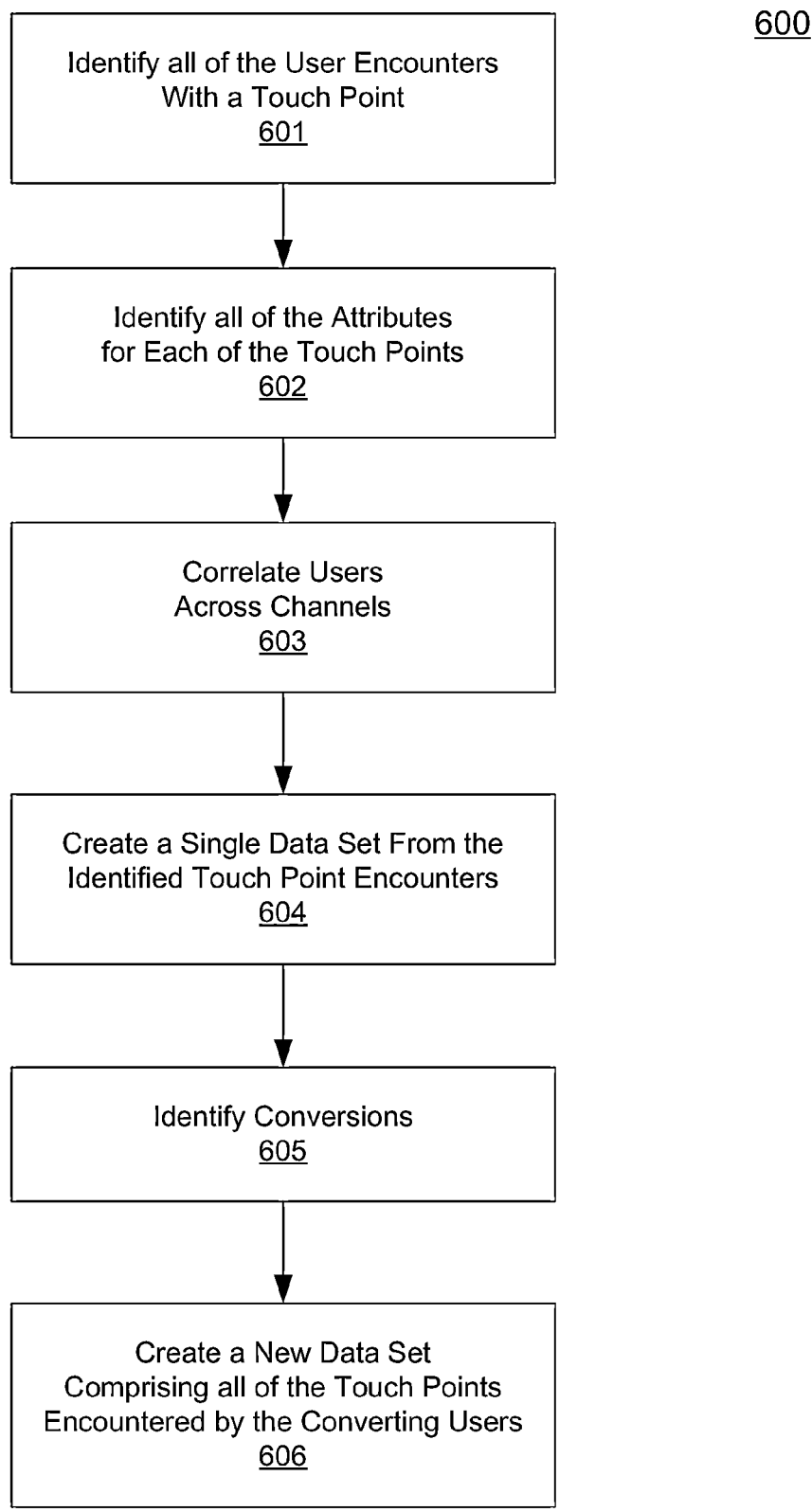
FIG. 6 depicts a flow diagram illustrating an example implementation of the procedure according to an embodiment.

Step 102 of FIG. 1 is illustrated in further detail according to one embodiment illustrated in the flow diagram 600 depicted in FIG. 6. At step 601, all of the user encounters with a particular touchpoint are identified. In one embodiment, this step may be carried out for all of the touchpoints that comprise a particular advertising campaign. This may entail collecting touchpoint data from every channel in which an advertisement of a particular campaign ran. At step 602, all of the attributes for each of these touchpoints are further identified. At step 603, all of the users are correlated across the disparate data from different channels. Because the data pertaining to different channels may come from different sources, the touchpoint encounters from distinct channels that correspond to the same user are identified. At step 604, a single data set is created from the identified touchpoint encounters. At step 605, amongst the touchpoint encounters identified in step 602, all of the conversions are identified. At step 606, a new data set is created comprising all of the touchpoints encountered by the converting users identified in step 604.

Figure 7:
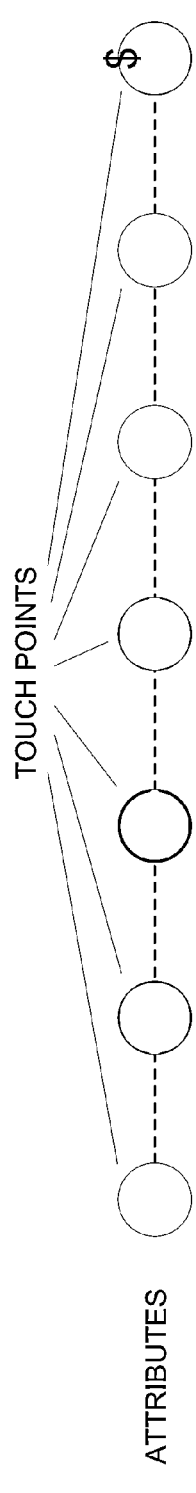
FIG. 7 illustrates an example data set processed for a user in accordance with one embodiment.

FIG. 7 illustrates an example data set processed for a user in accordance with one embodiment. As shown in FIG. 7, there are several touchpoints (e.g., seven) associated with a conversion. The example dataset of FIG. 7 correlates the various touchpoints with a plurality of attributes associated with those touchpoints. Specifically, the first column (column 1) identifies the attribute, columns 2-7 identify attribute values for attributes of column 1 for various touchpoints. For example, the first attribute (row 1) identifies the type of event for the touchpoint. The first touchpoint (column 2) was an impression presented to the user, while the second and third touchpoints (columns 3 and 4) were items the user clicked-on. Similarly, the other entries of the table of FIG. 7 identify attribute values for the attributes of column 1 for the various touchpoints.

Figure 8:
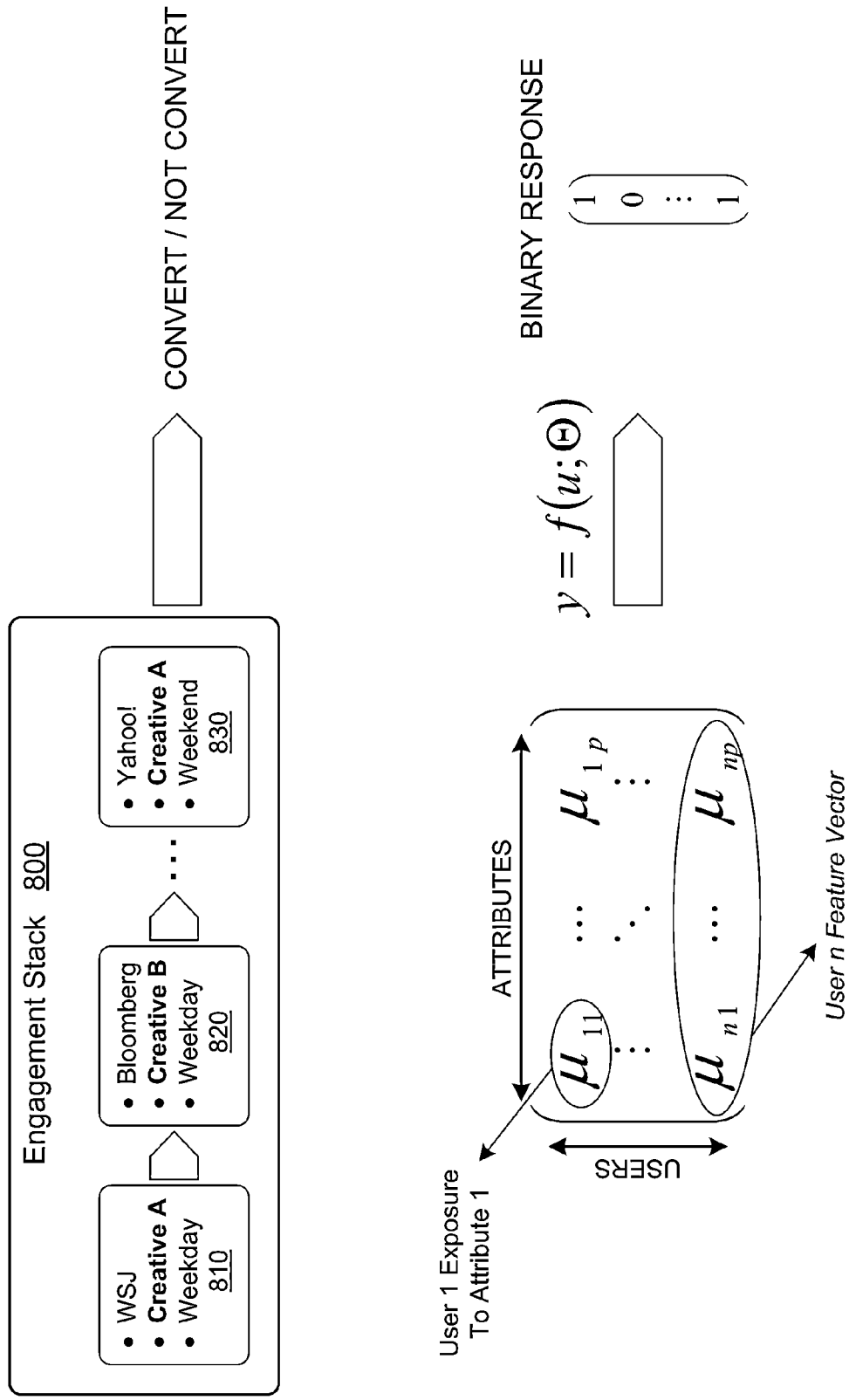
FIG. 8 illustrates one embodiment for part of the process of bottom-up attribution.

FIG. 8 illustrates one embodiment for part of the process of bottom-up attribution. As shown in FIG. 8, engagement stack 800 comprises a plurality of touchpoints for a plurality of users. For example, engagement 800 may comprise the output dataset created by aggregating all the touchpoints for multiple users across channels (e.g., step 604, FIG. 6). As shown in FIG. 8, engagement 810 includes attributes (e.g., publisher—WSJ, creative—"creative A", and the time of the engagement is "weekday"). The processes identifies, from the engagement stack 800, conversions or non-conversions. The identification of conversions and non-conversions is illustrated in process step 605 of FIG. 6.

FIG. 8 also conceptually illustrates the process of determining attribution by first generating a matrix of users and attributes. Specifically, for this embodiment, a "User Feature Vector", which includes a value for each attribute, is generated for each user (e.g., "p" attributes for "n" users in FIG. 8). The User Feature Vector is used in the attribution algorithm (e.g., $y=f(\mu;\Theta)$) to generate a binary response (e.g., conversion or non-conversion).

Figure 9:
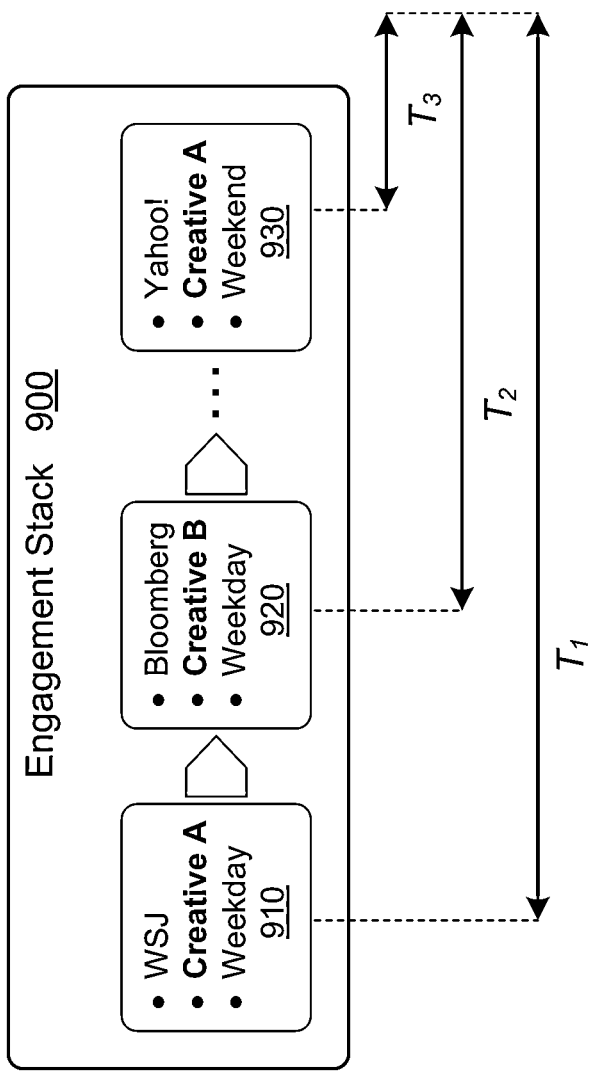
FIG. 9 is a block diagram illustrating another embodiment to input a time delay factor when computing attribution metrics.

FIG. 9 is a block diagram illustrating another embodiment to input a time delay factor when computing attribution metrics. For the example of FIG. 9, an engagement stack 900 includes a plurality of touchpoints (e.g., 910, 920 and 930). Each touchpoint comprises a plurality of attributes, as described above. For this embodiment, a "forgetting factor" is calculated based on the amount of time elapsed since the touchpoint occurred. For the example of engagement stack 900, a time "$T_1$" elapsed since touchpoint 910 occurred, a time "$T_2$" elapsed since touchpoint 920 occurred, and a time "$T_3$" elapsed since touchpoint 930 occurred. For this embodiment, a true score may be calculated as:

$$\text{Score} = \alpha(\text{WSJ,Creative }A\text{,Weekday}) \times \lambda(T_1) + \alpha(\text{Bloomberg,Creative }B\text{,Weekday}) \times \lambda(T_2) + \alpha(\text{Yahoo,Creative }A\text{,Weekend}) \times \lambda(T_3)$$

where α (attributes and attribute values) are estimated via machine learning and λ(T) is the forgetting factor calculated by multiplying a value by the time elapsed.

Figure 10:
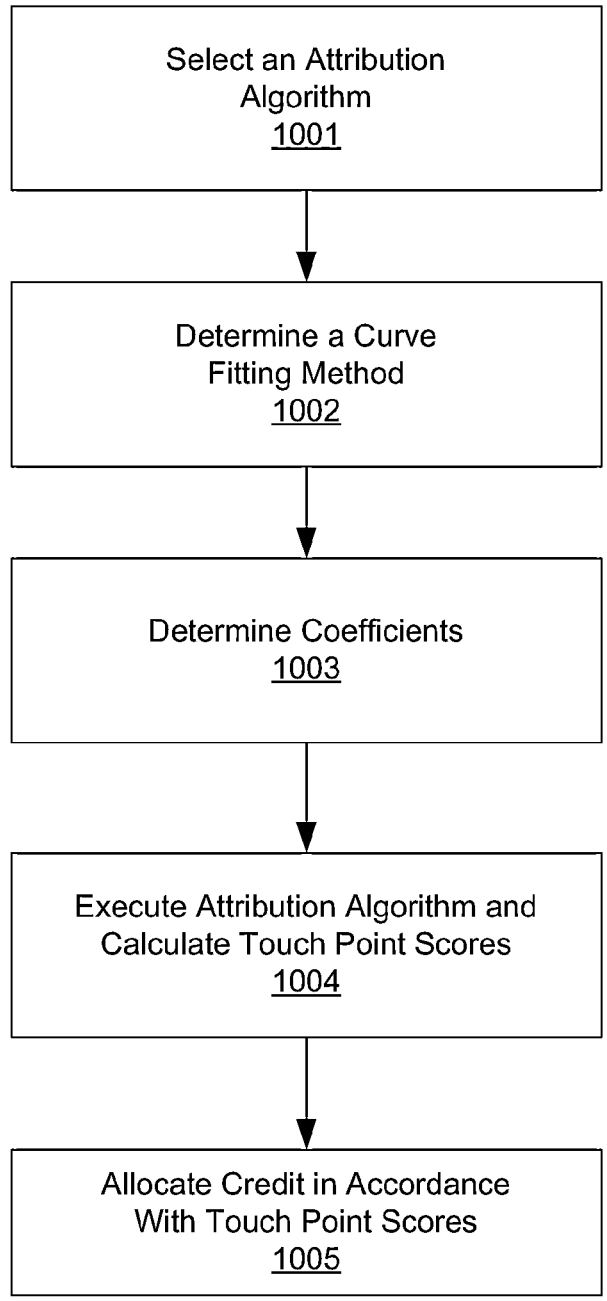
FIG. 10 depicts a flow diagram illustrating an example implementation of the procedure according to one embodiment.

Steps 105-107 of FIG. 1 are illustrated in further detail according to an embodiment by the flow diagram 1000 depicted in FIG. 10. At step 1001, an attribution algorithm is selected. The attribution algorithm determines the relative effect of each touchpoint in influencing each conversion given the attribute weights and the attribute value weights determined in steps 103 and 104 of FIG. 1. The attribution algorithm, which calculates the contribution of the touchpoint to the conversion, may be expressed as a function of the attribute importance (e.g., attribute weights) and attribute value lift (e.g., attribute value weights):

$$\text{Credit Fraction} = \Sigma_{a=1}^{n} f(\text{attribute importance}_a, \text{attribute value lift}_a)$$

wherein, "a" represents the attribute and "n" represents the number of attributes.

At step 1002 of FIG. 10, a curve fitting method is determined for the attribution algorithm selected in step 602. Curve fitting entails determining an equation for approximating a series of data points. In this series of embodiments, the conversion data derived in step 102 (FIG. 1) is modeled as a series of data points for which a set of constraints must be determined through curve fitting. These constraints correspond to the coefficients for the attribution algorithm. At step 1003, the coefficients are determined for the attribution algorithm, using the selected curve fitting technique, the attribute weights, and the attribute value weights. According to one embodiment, the coefficients are determined using a machine learning technique, such as logistic regression. However, any technique to determine the coefficients may be used without deviating from the spirit or scope of the invention.

At step 1004 of FIG. 10, the attribution algorithm is executed using the determined coefficients, resulting in a true score for each touchpoint encounter of each user. The sum total of the true scores of each touchpoint encounter for each user represents that user's propensity to convert. According to one embodiment, the scores are normalized such that their sum is a value between 0 and 0.49 for non-converting users and 0.50 and 1.0 for converting users.

The resulting data comprises a score for each touchpoint encountered by each converting user. These scores represent the relative influence of that touchpoint on the user's decision to convert. At step 1005 of FIG. 10, credit is allocated to the various touchpoints in accordance with each touchpoint score for each converting user, as described above.

An example iteration of the procedure illustrated by the flow diagram 600 of FIG. 6 is depicted in FIGS. 11A-11D. FIGS. 11A and 11B depict data tables pertaining to user touchpoint encounters in two channels, Channel 1 and Channel 2, respectively. These tables are derived in steps 301 and 302 of the procedure illustrated in flow diagram 300. Channels 1 and 2 may be two distinct content mediums—television and print, for example. Data from any content medium may be used without deviating from the spirit or scope of the invention. As shown in FIGS. 11A-11D, each data table lists the timestamp of the encounter, attributes of the touchpoint, attribute values of the touchpoint, a unique ID corresponding to the user, and whether or not the user converted upon encountering the touchpoint. As defined herein, a converting user is one that converted at least once upon encountering any of the touchpoints of an advertising campaign. In FIG. 11A that corresponds to channel 1, users U1 and U2 are identified as converting users. In FIG. 11B that corresponds to channel 2, user U5 is identified as a converting user. Although users U1 and U2 do not show a conversion in the table of FIG. 11B, they are nonetheless converting users because they were identified in the table of FIG. 11A. Thus, for this example, users U1, U2, and U5 are converting users whereas users U3 and U4 are non-converting users.

FIG. 11C depicts a data table in which every user's touchpoint encounters, shown in FIGS. 11A and 11B, from the disparate channels have been correlated and combined. The derivation of the data, shown in the table of FIG. 11C, corresponds to steps 603 and 604 of the procedure illustrated in flow diagram 600 of FIG. 6. In the table of FIG. 11C, which depicts an "AllUserStack", the 'Conversion' columns from FIGS. 11A and 11B has been replaced with an 'Assists' column. The "Assists" column signifies that a particular touchpoint encounter assisted with a conversion. Because one goal of the embodiments disclosed herein is to determine the effect of each touchpoint in influencing a conversion, the conversion is no longer attributed to a single touchpoint as in the tables depicted in FIGS. 11A and 11B; rather, the conversion is associated with all of the touchpoints that the user encountered. FIG. 11D depicts an updated table, ConvertedUserStack, for the example of FIGS. 11A-1C, with data pertaining to non-converting users removed. This table is derived in steps 605 and 606 of the procedure illustrated in flowchart 600 of FIG. 6.

Figure 12:
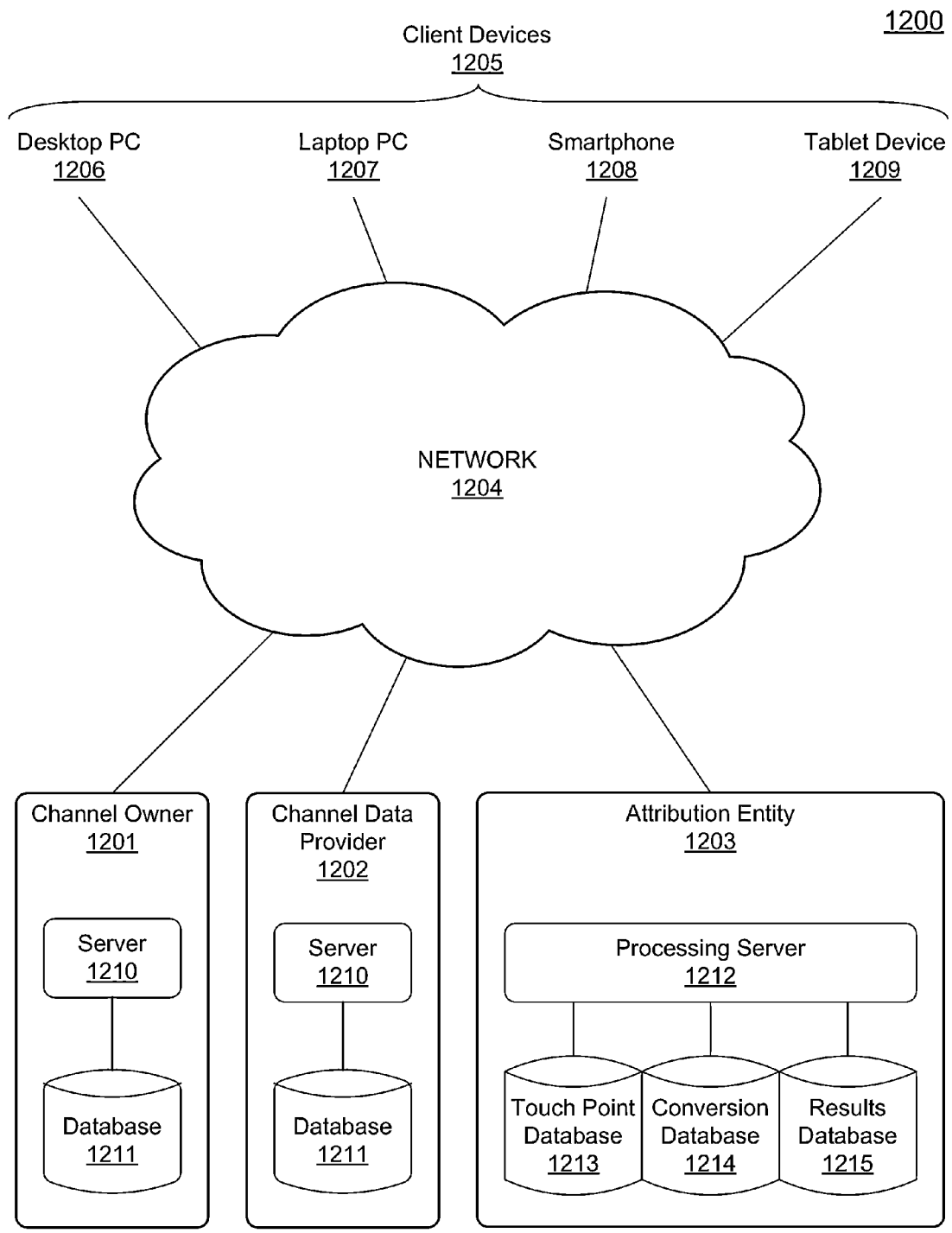
FIG. 12 depicts a diagram illustrating an exemplary environment for the operation of the methods and systems described in the present disclosure according to an embodiment.

An exemplary environment 1200 within which some embodiments of the invention may operate is illustrated in FIG. 12. The diagram 1200 of FIG. 12 depicts a channel owner 1201, a channel data provider 1202, and an Attribution Entity 1203. Each of Channel Owner 1201 and Channel Data Provider 1202 includes at least one Server 1210 and at least one Database 1211. Channel Owner 1201 is the operator or administrator of a content medium (e.g., television, internet portal, print publication, etc). Channel Data Provider 1202 is an entity that collects data pertaining to advertising touchpoints that appear within the content medium owned by Channel Owner 1201 and the conversions that result from them. Attribution Entity 803 performs tasks that comprise the embodiments disclosed herein.

According to one implementation of the exemplary environment, Channel Data Provider 1202 collects and receives data from Channel Owner 1201 via Network 1204. The data is then transmitted from Channel Data Provider 1202 (or, alternatively, directly from Channel Owner 1201) to Attribution Entity 1203, which stores it within Touchpoint Database 1213 and/or Conversion Database 1214. The operations of the embodiments described herein are executed within Processing Server 1212 using the data stored within Touchpoint Database 1213 and Conversion Database 1214. Data derived from the operations of the embodiments disclosed herein is stored within Results Database 1215. Each of Server 1210 and Processing Server 12 may comprise a single computer system or multiple computer systems that execute operations in a distributed manner. Each of Database 1211, Touchpoint Database 1213, Conversion Database 1214, and Results Database 1215 comprise a single computer-readable storage medium or multiple computer-readable storage mediums across which the data is distributed. The data stored therein may comprise numerical values and formulae or data related to a visual interface.

Data processed by Processing Server 1212 according to embodiments disclosed herein is transmitted via the network 1204 and is received by at least one of Client Devices 1205. Client Devices 1205 may include Desktop PC 806, Laptop PC 807, Smartphone 808, Tablet Device 809, or any other computerized device with a visual display. Client Devices 1205 display the processed data via the devices' visual display. Alternatively, any combination of Channel Owner 1201, Channel Data Provider 1202, Attribution Entity 1203, and Client Devices 1205 may reside on the same machine.

Network 1204 may comprise any combination of networks including, without limitation, the web (i.e. the Internet), a local area network, a wide area network, a wireless network, a cellular network, etc. The network 1208 includes signals comprising data and commands exchanged by and among Channel Owner 1201, Channel Data Provider 1202, Attribution Entity 1203, and Client Devices 1205 as well as any intermediate hardware devices used to transmit the signals.

Figure 13:
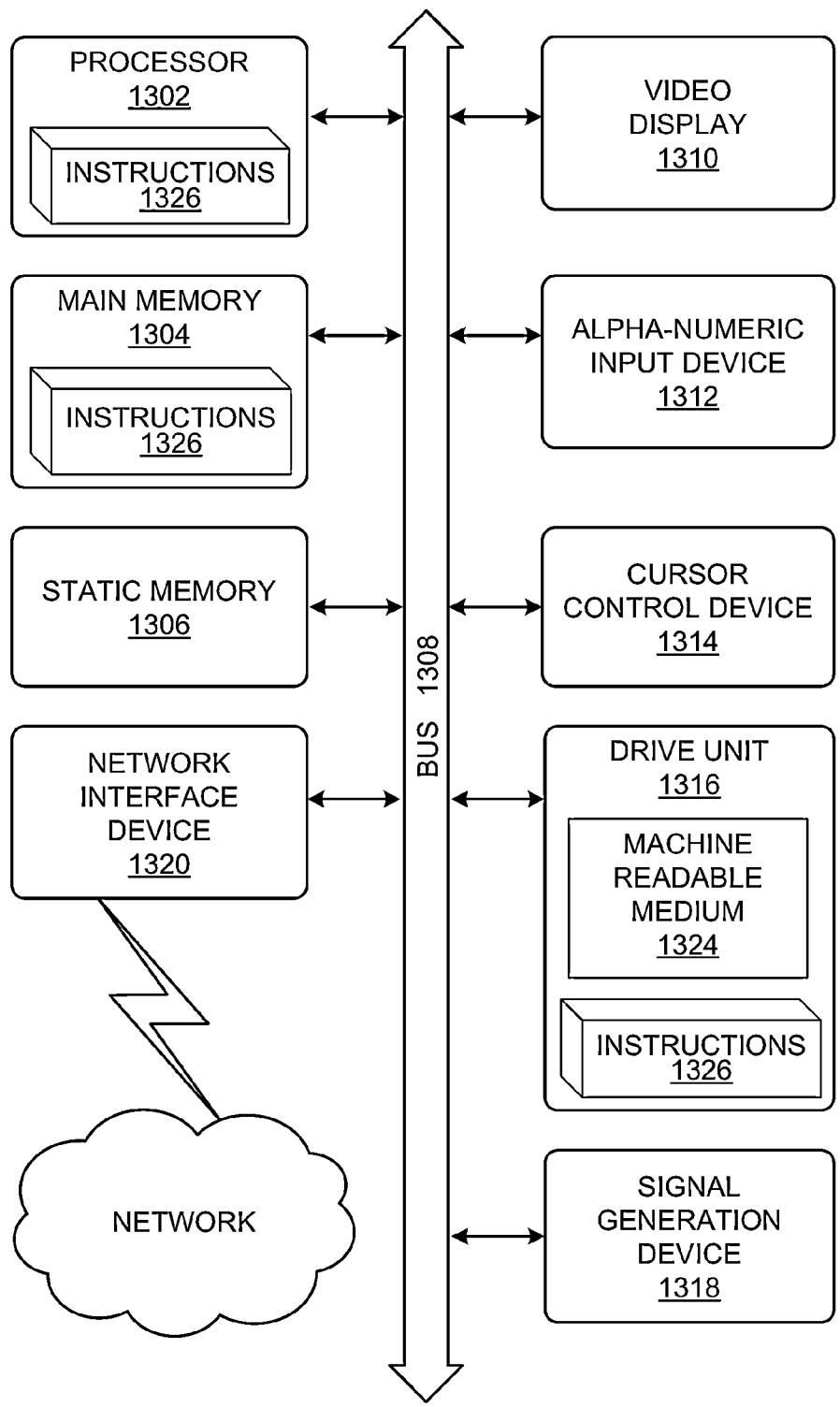
FIG. 13 depicts a diagram illustrating an exemplary hardware implementation for the operation of the methods and systems described in the present disclosure according to an embodiment.

FIG. 13 depicts a diagrammatic representation of a machine in the exemplary form of a computer system 1300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1300 includes a processor 1302, a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a cursor control device 1314 (e.g., a mouse), a disk drive unit 1316, a signal generation device 1318 (e.g., a speaker), and a network interface device 1320.

The disk drive unit 1316 includes a machine-readable medium 1324 on which is stored a set of instructions (i.e., software) 1326 embodying any one, or all, of the methodologies described above. The software 1326 is also shown to reside, completely or at least partially, within the main memory 1304 and/or within the processor 1302. The software 1326 may further be transmitted or received via the network interface device 1320.

It is to be understood that various embodiments may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine (e.g., a computer). For example, a machine-readable medium includes read-only memory (ROM); random access memory (RAM); magnetic disk storage media; optical storage media; flash memory devices; or any other type of media suitable for storing or transmitting information.

In the present specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A computer implemented method for allocating credit for conversions among advertising touchpoints, the computer implemented method comprising:
    storing in a computer, a plurality of touchpoint encounters that represent marketing messages exposed to a plurality of users, wherein each of the touchpoint encounters comprise a plurality of attributes and the attributes comprise a plurality of attribute values;
    sorting the data for the touchpoint encounters in the computer to separate into converting user data, which comprises touchpoint encounters for users that exhibited a positive response to the marketing message, and non-converting user data that comprises touchpoint encounters for users that exhibited a negative response to the marketing message;
    retrieving, from storage, the converting user data and the non-converting user data;
    training, using machine-learning techniques in a computer, the converting user data and the non-converting user data as training data to generate attribute importance data that reflects importance of the attributes, relative to other attributes, to the response of the marketing message;
    training, using machine-learning techniques in a computer, the converting user data and the non-converting user data as training data to generate attribute value lift data that reflects importance of the attribute values, relative to other attribute values, to the response of the marketing message; and
    calculating, using a computer, a score for a user that measures propensity of the user to convert by aggregating expressions from touchpoint encounters in accordance with:

User Score=α(the attribute importance data,the attribute value lift data)×λ($T_1$)+α(the attribute importance data,the attribute value lift data)×λ ($T_2$)+α(the attribute importance data,the attribute value lift data)×λ($T_3$)

wherein, α (the attribute importance data, the attribute value lift data) which represents the attribute importance and the attribute value lift for the touchpoint encounter, is calculated using an attribution algorithm with a plurality of coefficients derived from a curve fitting technique, and λ ($T_1$), λ ($T_2$) and λ ($T_3$) represent forgetting factors calculated by multiplying a constant, λ, by an elapsed time from which the user encountered the touchpoint encounter.

2. The computer implemented method of claim 1, wherein the touchpoint encounters correspond to a plurality of media channels.

3. The computer implemented method of claim 2, further comprising receiving the touchpoint encounters from a plurality of channel data providers.

4. A non-transitory computer readable medium that stores instructions for allocating credit for conversions among advertising touchpoints, which, when executed, cause a processor to:
    store a plurality of touchpoint encounters that represent marketing messages exposed to a plurality of users, wherein each of the touchpoint encounters comprise a plurality of attributes and the attributes comprise a plurality of attribute values;
    sort the data for the touchpoint encounters in the computer to separate into converting user data, which comprises touchpoint encounters for users that exhibited a positive response to the marketing message, and non-converting user data that comprises touchpoint encounters for users that exhibited a negative response to the marketing message;

retrieve, from storage, the converting user data and the non-converting user data;

train, using machine-learning techniques in a computer, the converting user data and the non-converting user data as training data to generate attribute importance data that reflects importance of the attributes, relative to other attributes, to the response of the marketing message;

train, using machine-learning techniques in a computer, the converting user data and the non-converting user data as training data to generate attribute value lift data that reflects importance of the attribute values, relative to other attribute values, to the response of the marketing message; and calculate, using a computer, a score for a user that measures propensity of the user to convert by aggregating expressions from touchpoint encounters in accordance with:

$$\text{User Score} = \alpha(\text{the attribute importance data}, \text{the attribute value lift data}) \times \lambda(T_1) + \alpha(\text{the attribute importance data}, \text{the attribute value lift data}) \times \lambda(T_2) + \alpha(\text{the attribute importance data}, \text{the attribute value lift data}) \times \lambda(T_3)$$

wherein, $\alpha$ (the attribute importance data, the attribute value lift data) which represents the attribute importance and the attribute value lift for the touchpoint encounter, is calculated using an attribution algorithm with a plurality of coefficients derived from a curve fitting technique, and $\lambda(T_1)$, $\lambda(T_2)$ and $\lambda(T_3)$ represent forgetting factors calculated by multiplying a constant, $\lambda$, by an elapsed time from which the user encountered the touchpoint encounter.

5. The computer readable medium of claim 4, wherein the touchpoint encounters correspond to a plurality of channels.

6. The computer readable medium of claim 5, wherein the touchpoint encounters are received from a plurality of channel data providers.

7. A system for allocating credit for conversions among advertising touchpoints, the system comprising at least one processor and memory for:

storing, using a computer, a plurality of touchpoint encounters that represent marketing messages exposed to a plurality of users, wherein each of the touchpoint encounters comprise a plurality of attributes and the attributes comprise a plurality of attribute values;

sorting the data for the touchpoint encounters in the computer to separate into converting user data, which comprises touchpoint encounters for users that exhibited a positive response to the marketing message, and non-converting user data that comprises touchpoint encounters for users that exhibited a negative response to the marketing message;

retrieving, from storage, the converting user data and the non-converting user data;

training, using machine-learning techniques in a computer, the converting user data and the non-converting user data as training data to generate attribute importance data that reflects importance of the attributes, relative to other attributes, to the response of the marketing message;

training, using machine-learning techniques in a computer, the converting user data and the non-converting user data as training data to generate attribute value lift data that reflects importance of the attribute values, relative to other attribute values, to the response of the marketing message; and calculating, using a computer, a score for a user that measures propensity of the user to convert by aggregating expressions from touchpoint encounters in accordance with:

$$\text{User Score} = \alpha(\text{the attribute importance data}, \text{the attribute value lift data}) \times \lambda(T_1) + \alpha(\text{the attribute importance data}, \text{the attribute value lift data}) \times \lambda(T_2) + \alpha(\text{the attribute importance data}, \text{the attribute value lift data}) \times \lambda(T_3)$$

wherein, $\alpha$ (the attribute importance data, the attribute value lift data) which represents the attribute importance and the attribute value lift for the touchpoint encounter, is calculated using an attribution algorithm with a plurality of coefficients derived from a curve fitting technique, and $\lambda(T_1)$, $\lambda(T_2)$ and $\lambda(T_3)$ represent forgetting factors calculated by multiplying a constant, $\lambda$, by an elapsed time from which the user encountered the touchpoint encounter.

8. The system of claim 7, wherein the touchpoint encounters correspond to a plurality of media channels.

9. The system of claim 8, further comprising at least one processor and memory for receiving the touchpoint encounters from a plurality of channel data providers.

* * * * *